United States Patent
De Marchi

(10) Patent No.: US 7,220,061 B2
(45) Date of Patent: May 22, 2007

(54) CONNECTOR-PLUG PART FOR AN OPTICAL PLUG-IN CONNECTION, METHOD FOR CONNECTING A CONNECTOR-PLUG PART TO THE END OF AN OPTICAL WAVEGUIDE CABLE AND DEVICE FOR CARRYING OUT SAID METHOD

(75) Inventor: Silverio De Marchi, Ascona (CH)

(73) Assignee: Diamond SA, Losone (CH)

( * ) Notice: Subject to any disclaimer, the term of this patent is extended or adjusted under 35 U.S.C. 154(b) by 42 days.

(21) Appl. No.: 10/517,343

(22) PCT Filed: May 30, 2003

(86) PCT No.: PCT/CH03/00338

§ 371 (c)(1),
(2), (4) Date: Dec. 9, 2004

(87) PCT Pub. No.: WO04/001471

PCT Pub. Date: Dec. 31, 2003

(65) Prior Publication Data

US 2005/0201692 A1      Sep. 15, 2005

(30) Foreign Application Priority Data

Jun. 24, 2002    (CH) ..................... 1084/02

(51) Int. Cl.
*G02B 6/36* (2006.01)
*G02B 6/00* (2006.01)

(52) U.S. Cl. ............................. 385/76; 385/77; 385/86
(58) Field of Classification Search ................. None
See application file for complete search history.

(56) References Cited

U.S. PATENT DOCUMENTS

| 4,946,249 | A | * | 8/1990 | Barlow et al. ................ 385/97 |
| 5,367,594 | A | * | 11/1994 | Essert et al. .................. 385/70 |
| 5,546,491 | A | * | 8/1996 | Loch ........................... 385/99 |
| 5,717,813 | A | * | 2/1998 | Harman et al. .............. 385/147 |
| 5,818,993 | A | * | 10/1998 | Chudoba et al. ............. 385/81 |
| 5,894,536 | A | * | 4/1999 | Rifkin et al. ................. 385/99 |
| 6,412,640 | B1 | * | 7/2002 | Destanque et al. ......... 206/581 |
| 6,443,633 | B1 | * | 9/2002 | Liberty et al. ................ 385/99 |
| 6,672,774 | B2 | * | 1/2004 | Theuerkorn et al. .......... 385/86 |

FOREIGN PATENT DOCUMENTS

EP         0 864 888 A1    8/1998
WO         96/31795 A1     10/1996

* cited by examiner

*Primary Examiner*—Sung Pak
(74) *Attorney, Agent, or Firm*—The Nath Law Group; Jerald L. Meyer; Teresa M. Arroyo

(57) ABSTRACT

In order to advantageously weld a pre-mounted connector-plug part (1) to an optical waveguide cable, the connector-plug part is provided with a pin holder (4) receiving a connector-plug pin (2) on a pin receiving section (5). Preferably, two cladding parts (8, 8') form a cable receiving section (6) in said pin holder. In order to carry out welding in a simple manner on the bare end (22) of the end of a fiber, the cladding parts (8, 8') can be pivoted around a hinge (9, 9') between an open position and a closed position.

18 Claims, 4 Drawing Sheets

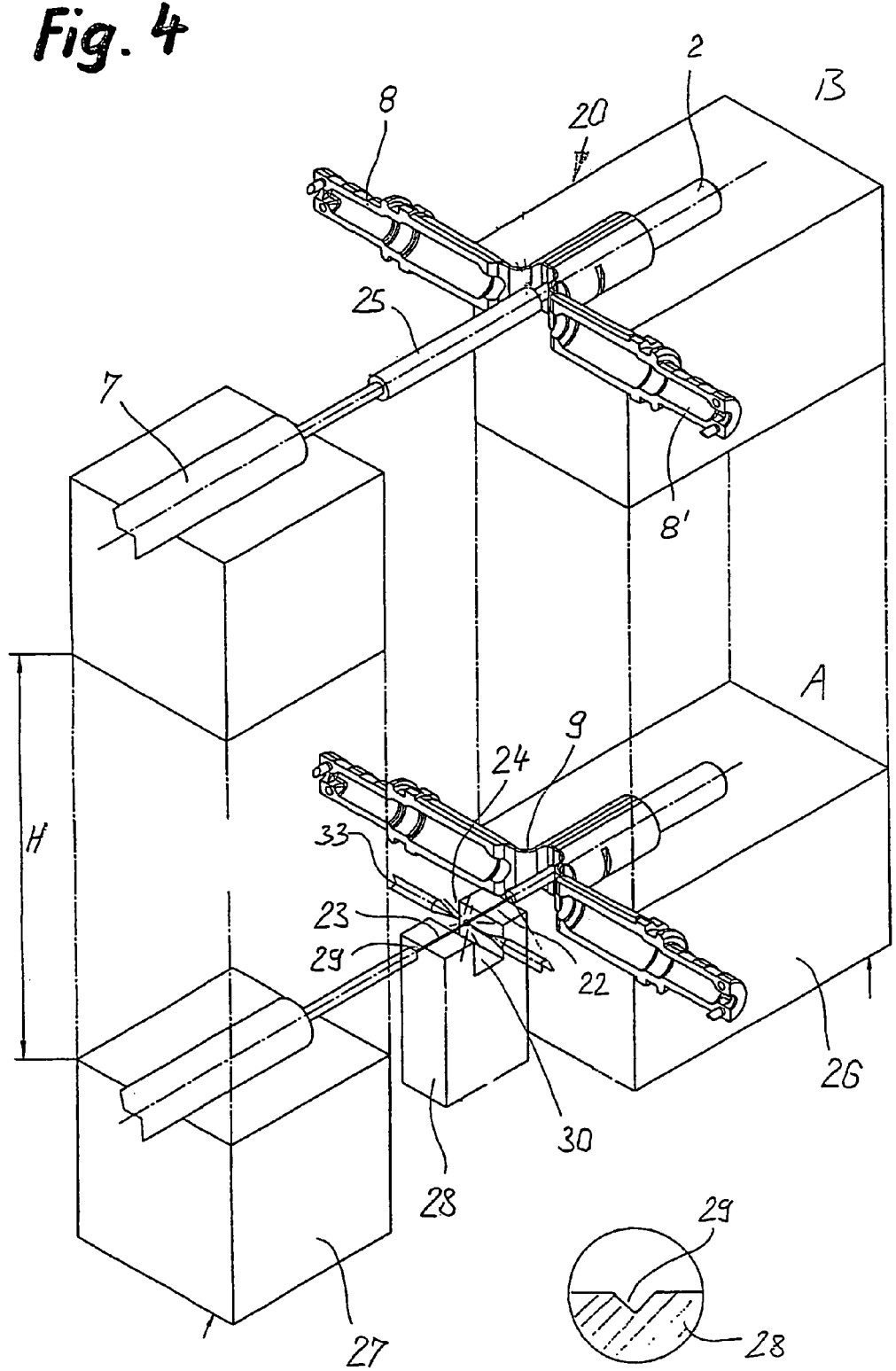

Figure 3:
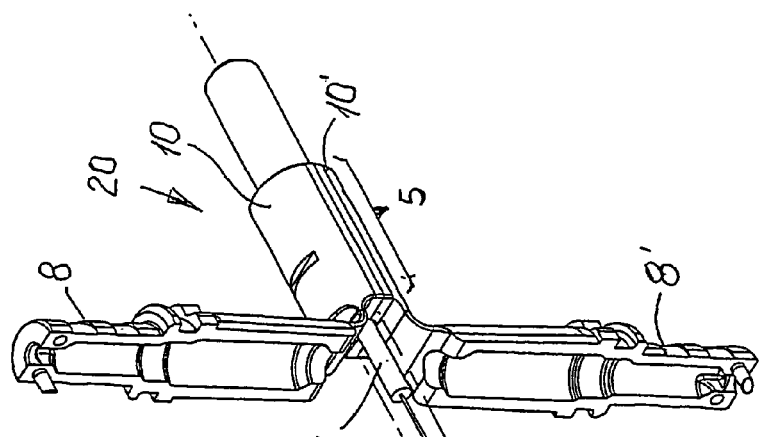

CONNECTOR-PLUG PART FOR AN OPTICAL PLUG-IN CONNECTION, METHOD FOR CONNECTING A CONNECTOR-PLUG PART TO THE END OF AN OPTICAL WAVEGUIDE CABLE AND DEVICE FOR CARRYING OUT SAID METHOD

The invention relates to a connector-plug part for an optical plug-in connection according to the precharacterizing clause of claim 1. As is evident, the main task of the connector-plug part is that of ensuring a tension-resistant connection between the connector-plug pin and the optical waveguide cable. At the same time, assembly should also be possible under conditions in the field.

There are in principle two possible ways in which an optical waveguide cable is connected to a connector-plug part. The optical waveguide cable may already be prefabricated with the connector-plug part at the factory as what is known as a pigtail, so that finally the end of the pigtail to be connected to a power supply system by a welded connection. Alternatively, however, it is also possible for just a fiber stub to be inserted into the connector-plug pin at the factory, the welding to the optical waveguide cable taking place directly at the connector-plug part. Connector-plug parts suitable for the latter method are described for example in WO 96/31795 or in EP 864 888. For attaching the welding electrodes, special openings or clearances are provided.

A disadvantage of the known welding technique at the fiber stub is that the welded location itself is difficult to access and that observation of the welding operation is also made more difficult. It is therefore an object of the invention to provide a connector-plug part of the type stated at the beginning which is particularly suitable for the welding technique at the fiber stub, it being possible for the welding operation itself to be carried out as unhindered as possible and with good viewing conditions. It is intended in this case that both the pre-assembly and the final assembly of the connector-plug part can be carried out quickly and without complex auxiliary means.

This object is achieved according to the invention by a connector-plug part which has the features in claim 1. The connector-plug pin itself may in this case be pre-assembled independently of its mounting or structure in the pin receiving section. The cladding part, which can be pivoted out at the joint, makes it possible in a particularly simple way for the welded location at the fiber stub to be exposed and consequently made accessible. In certain cases, the pivotable cladding part could, however, also be advantageous in connection with the pre-fabrication of pigtails.

It is particularly advantageous for the entire pin holder to comprise at least two shell parts, which can be fitted together along the longitudinal center axis, each shell part having a pivotable cladding part. The shell parts can be easily produced and can be closed around the connector-plug pin. However, it goes without saying that it would also be conceivable to form the pin holder in one piece, at least in the region of the pin receiving section.

The pivotable cladding parts may altogether form the cable receiving section and be connected to the pin receiving section at the joint. Alternatively, however, it would also be conceivable for the pivotable cladding part to extend only over part of the length of the cable receiving section.

Particular advantages arise in technical production-related terms if the pin holder comprises two identical shell parts which can be fitted together on a plane running through the longitudinal center axis. In this way, different types of shell parts do not have to be produced, because the pin holder can be assembled from two identical shell parts.

For the connection of neighboring shell parts, projections and clearances which engage in one another, in particular conical lugs and lug openings, may be provided on their contacting surfaces. Depending on the conicity chosen, the two shell parts may be joined together by slight pressure. Since the pin holder generally still has to be inserted into a connector-plug housing, it is particularly expedient if at least one conical section, which can be pressed into a corresponding conical receptacle on the connector-plug housing, is provided on the outside of the pin holder.

The pin holder advantageously consists of a plastic material, the joint being a film hinge. As is evident, the pivotable cladding part can in this way be formed in one piece with the other parts by the injection-molding process. Given correct choice of the plastic and given correct dimensioning, an adequate mechanical load-bearing capacity of the film hinge can be achieved without impairing the properties of the joint.

In the case of optical plug-in connections, it is customary for the connector-plug pin to be axially prestressed to maintain loss-free light transmission under various mechanical conditions. In the present case, the connector-plug pin may be mounted with limited displaceability in the pin receiving section under axial spring prestressing. Alternatively, however, it is also conceivable for the connector-plug pin to be fixedly held in the pin receiving section and for at least one axially resilient region to be provided on the cable receiving section.

A comparable solution is also described for example in EP 864 888, mentioned at the beginning.

For the displaceable mounting of the connector-plug pin, it is expedient if a rib which engages in a clearance in the outer circumferential surface of the connector-plug pin in such a way that its resilient displacement is limited and that it is held in a rotationally fixed manner is arranged on the inside of at least one shell part, in the region of the pin receiving section. The prestressing can be achieved with a helical compression spring which is supported in the pin receiving section on the one hand against an abutment and on the other hand against the rear part of the connector-plug pin.

A particularly optimal way of working for use in the field is obtained if the connector-plug part is prepared as a pre-assembled unit for connecting onto the end of an optical waveguide cable. In this case, an optical waveguide stub is fastened in the connector-plug pin in such a way that its stripped end on the cable side lies within the pivoting region of the cladding part, the cladding part or the cladding parts being kept in an at least partly opened position. The fixing and centering of the optical waveguide stub may take place by different methods that are already known per se. The linear dimensioning within the pivoting region of the cladding parts ensures that subsequent cutting to length does not have to be carried out during use in the field, but that the intended welded location lies at the correct place within the pin holder. Complete closing of the cladding parts is not desired, since they can only be opened again with difficulty. The cladding parts must therefore be kept in the open position at least to the extent that the conical lugs cannot engage. In such a position, the fiber stub would also be adequately protected. The cladding parts may, however, also already be pivoted open to the extent necessary for the later welding process, for example by 90°, in relation to the longitudinal center axis. In such a case, a protective cap may be provided, protecting the protruding fiber stub and if appropriate also keeping the cladding parts in the open position.

The invention also relates to a method for connecting a connector-plug part to the end of an optical waveguide cable, which method has the features in claim 13. By contrast with the conventional welding technique with welding inside the connector-plug pin or inside the pin holder, in the case of the method according to the invention the conductor ends to be welded can be centered very precisely in relation to each other. The attachment of the welding device takes place without any hindrance and the welded location can also be optimally observed. After the welding operation, the cladding parts need only be snapped together, a tension-resistant crimping with the cable sheath also taking place.

After the welding, the welded location can be enclosed with a protective element. This may either already be pushed onto the optical waveguide beforehand, and is then merely also displaced axially after the welding. Alternatively, the protective element could also be formed in such a way that it can be fitted on after the welding. In order to create space for such manipulations, it is expedient if, after the welding, the pin holder and the cable end are removed, in particular raised, from the centering block in the clamped state. As is evident, a few centimeters are already sufficient for this.

Finally, the invention also relates to a device for carrying out the method which is characterized by the features in claim 16.

The clamping of the pin holder and the cable end and the alignment in a v-shaped centering groove of the ends of the optical waveguides to be connected ensure a very precise welded connection. The clearance on the centering block in the region of the intended welded location makes good accessibility and ventilation of the welded location possible. In view of the very small lift, the lifting device for raising the clamping means could also be manually actuated.

Figure 2:
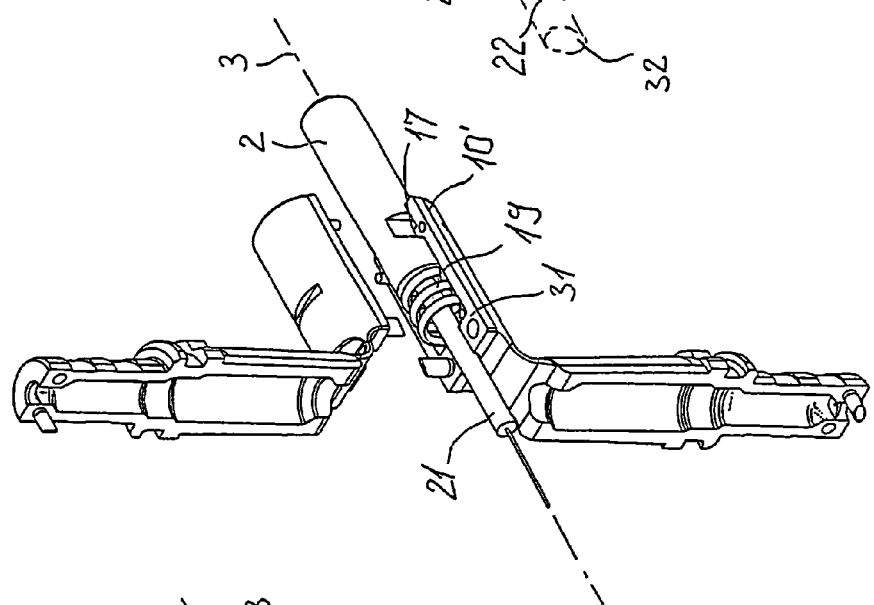
Figure 1:
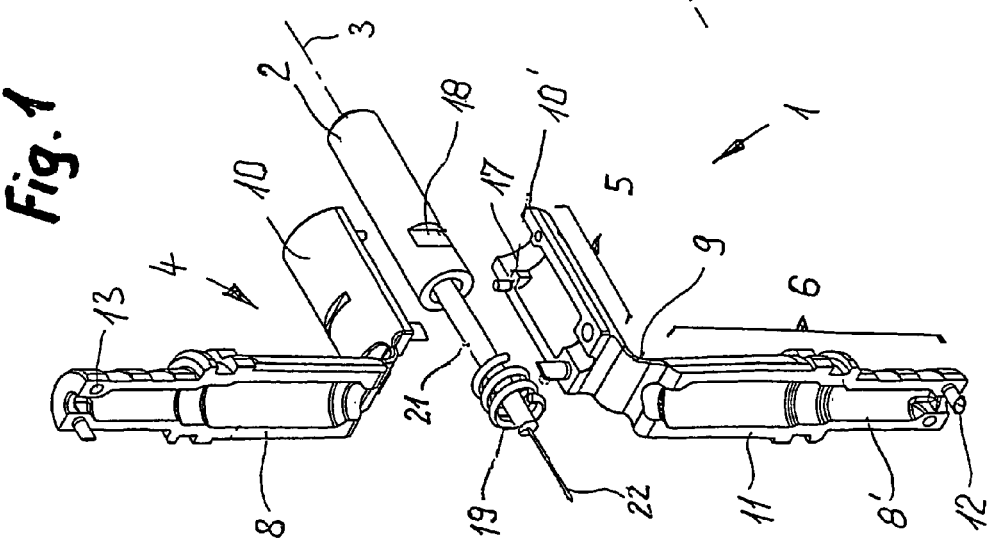
Figures 5, 6:
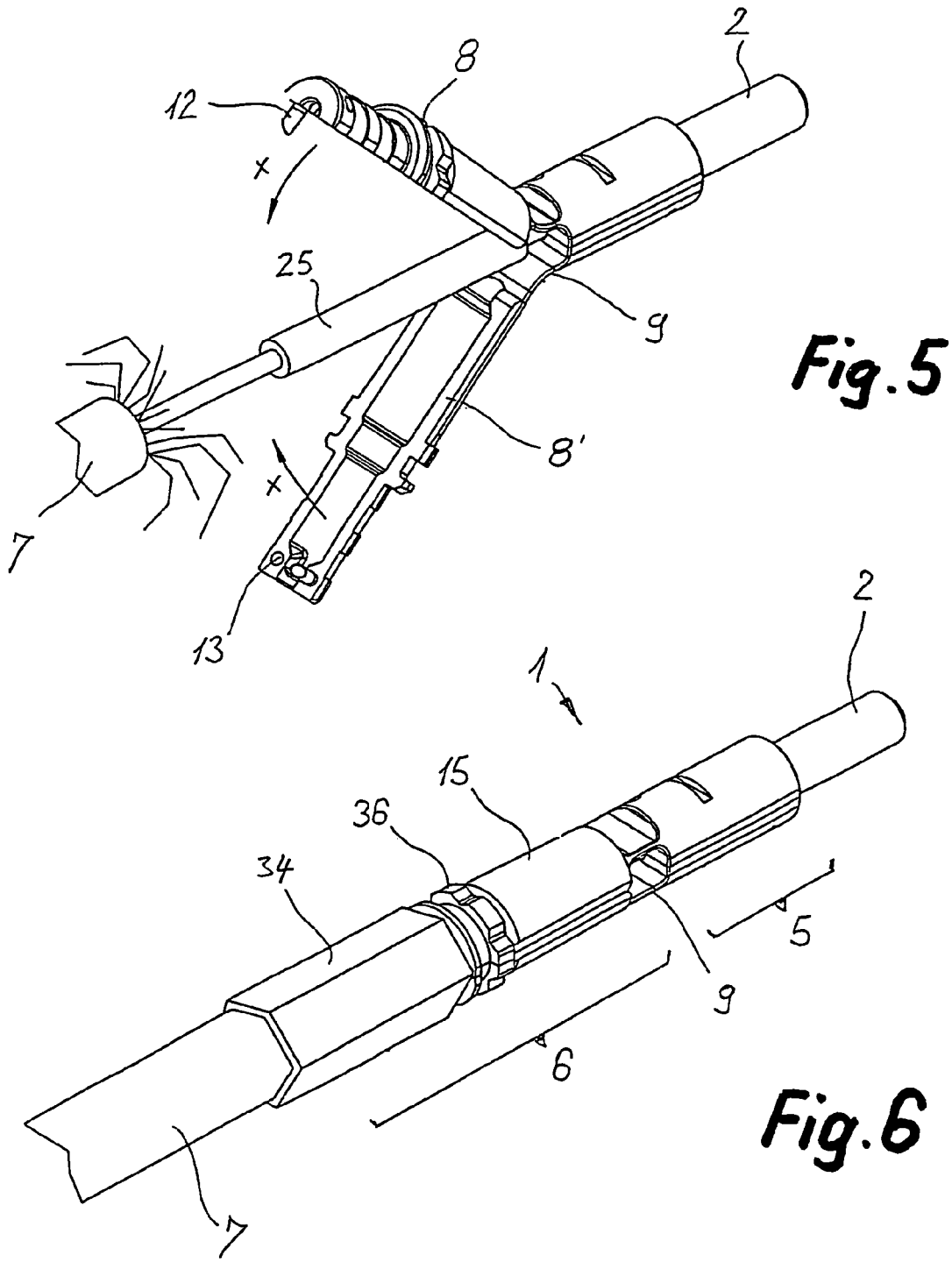
Figure 7:
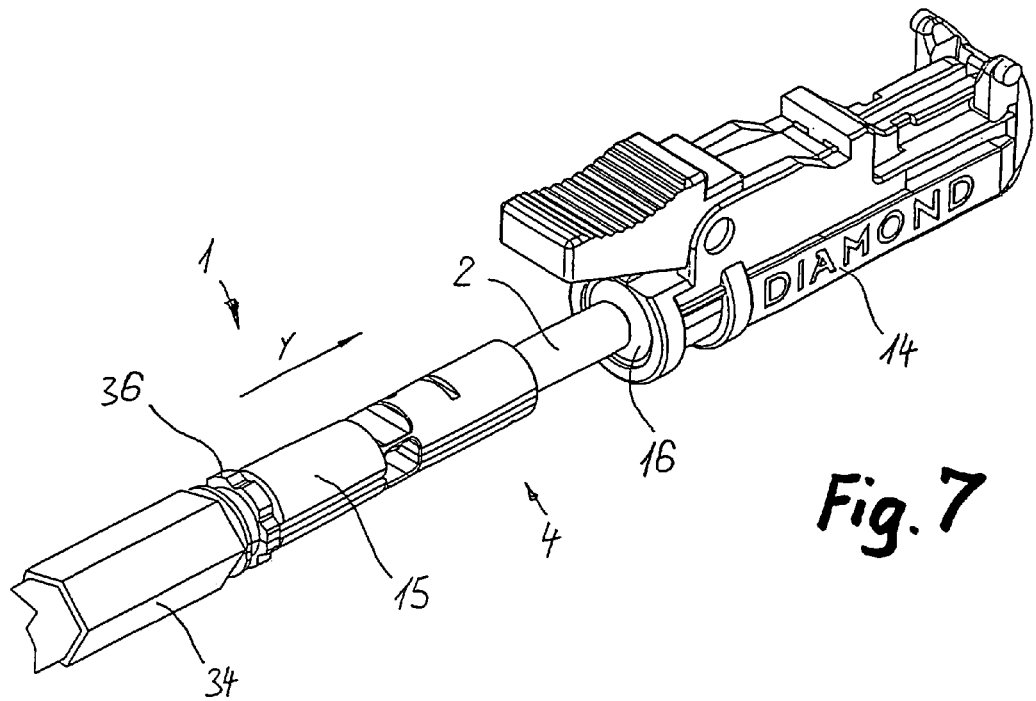
Figure 8:
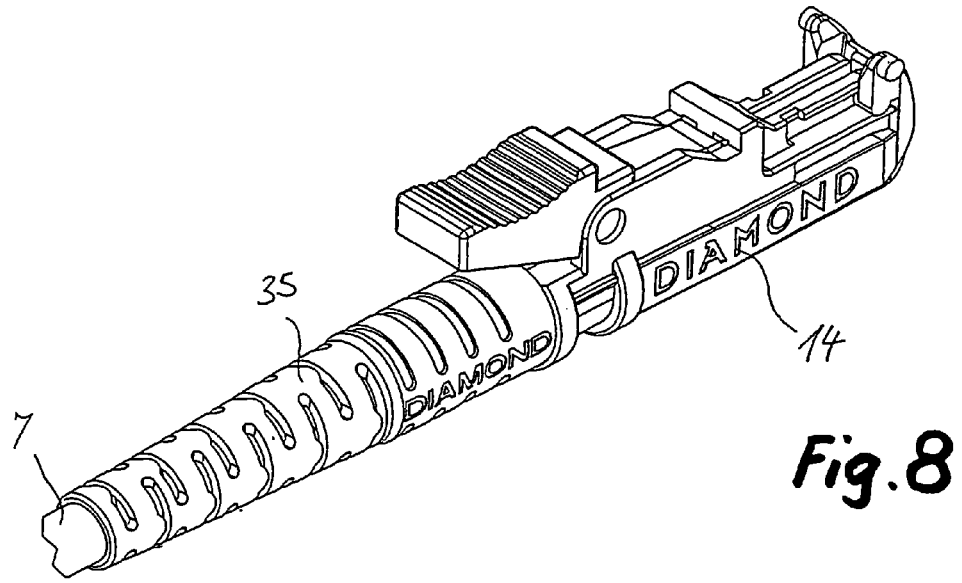

Further advantages and individual features of the invention emerge from the description which follows of an exemplary embodiment and from the drawings, in which:

FIG. 1 shows a perspective representation with the individual parts of a connector-plug part before the pre-assembly, FIG. 2 shows the connector-plug part according to FIG. 1 with inserted connector-plug pin, FIG. 3 shows the connector-plug part according to FIG. 2 after the pre-assembly, FIG. 4 shows a perspective representation of a device for carrying out the welding method in two different working positions, FIG. 5 shows a perspective representation of a connector-plug part after the welding operation and before the closing of the shell parts, FIG. 6 shows the connector-plug part according to FIG. 5 after the pre-fabrication with the cable, FIG. 7 shows the connector-plug part according to FIG. 6 before the insertion in a connector-plug housing and FIG. 8 shows a perspective representation of a ready assembled connector plug.

According to FIG. 1, a connector-plug part, designated as a whole by 1, substantially comprises a pin holder, designated as a whole by 4, and a connector-plug pin 2 of a generally very hard material, such as ceramic or hard metal for example. The pin holder itself in turn comprises two shell parts 10, 10', which can be fitted together on a plane running through a longitudinal center axis 3. Finally, the pin holder 4 (in the closed state) is divided into a pin receiving section 5 and a cable receiving section 6.

The two shell parts 10, 10' consist for example of plastic material, preferably being injection-molded in the opened-out position for technical molding-related reasons. The two shell parts are completely identical. For the connection to each other, conical lugs 12 and corresponding lug openings 13 are provided on the mutually contacting surfaces 11. The hermaphroditic arrangement of these connecting means allows the sleeve-like pin holder 4 to be produced from shell parts of a single type.

In the case of the present exemplary embodiment, each shell part 10, 10' forms over the entire length of the cable receiving section 6 a cladding part 8, 8', which is connected to the pin receiving section 5 by a film hinge 9. The cladding parts can in this case be swung out unproblematically by 90° in relation to the longitudinal center axis 3.

The connector-plug pin 2 is provided on its outer circumferential surface with two plane-parallel clearances 18. A pair of corresponding ribs 17 on the inside of the pin receiving section 5 engage in these clearances, a certain resilient displacement in the direction of the longitudinal center axis 3 being allowed. A helical compression spring 19 provides the necessary axial prestressing.

In the case of the exemplary embodiment according to FIG. 1, an optical waveguide stub 21 has already been fixedly connected to the connector-plug pin 2, and centered in it. This stub has a bare, stripped end 22.

According to FIG. 2, the connector-plug pin 2 is placed on the shell part 10', into the receptacle provided for this purpose. The helical compression spring 90 is in this case supported against an abutment 31, so that the connector-plug pin 2 is prestressed into its outermost position, where it is restricted by the rib 17. The abutment 31 has a through-opening for the fiber stub 21.

According to FIG. 3, the two shell parts 10, 10' are snapped together in the region of the pin receiving section 5, while the two cladding parts 8, 8' are angled away by 90°, so that the fiber stub 21 is exposed. To protect the fiber stub, a protective cap 32 may be fitted onto it. The entire arrangement forms a pre-assembled unit 20, as can be prepared at the factory for use in the field.

The connection of a pre-assembled unit 20 to the end of an optical waveguide cable 7 is represented by FIG. 4. The device provided for this purpose is represented in the two working positions A and B. It substantially comprises a first clamping means 26 and a second clamping means 27, arranged at a distance from the latter. Arranged in between is a centering block 28 with a v-shaped centering groove 29. The centering groove is provided in the region of the intended welded location 24 with a clearance 30. This clearance makes it possible for welding electrodes 33 or other suitable welding devices, such as laser heads etc., to be brought up to the welded location.

First, the pre-assembled unit 20 is clamped in on the first clamping means 26. The same happens with the optical waveguide cable 7, which is fixed on the second clamping means 27. The bare conductor ends 22 and 23 lie opposite each other in the v-groove 29. By activating the welding device 33, fusing of the conductor ends takes place.

This is followed by simultaneous raising of the first and second clamping means 26 and 27 by the amount of lift H into the second working position B. This may for example be a lift of 20 mm. As is evident, in this raised position the welded location is moved out of the region of the centering groove 29 and the welding device 33. Now the welded location can be covered with a protective element 25.

A unit prepared in this way is represented after the welding operation in FIG. 5. The two cladding parts 8, 8' are now carefully pivoted together in the direction of the arrow x and then snapped together. The last operation is to apply a crimping sleeve 34 according to FIG. 6. This serves for the actual tension relief, because it transmits the forces on the outer cable cladding to the connector-plug part 1.

Also required in most cases for the handling of the optical plug-in connection is a connector-plug housing 14, which can be made to engage in a corresponding connector-plug socket. Details of such connector plugs are known to a person skilled in the art and are not described in any more detail here.

For the insertion of the connector-plug part 1 into the connector-plug housing 14, the pin holder 4 is provided on its outer circumferential surface with a conical section 15. The connector-plug part is inserted into the connector-plug housing 14 in the direction of the arrow Y, the conical section 15 being pressed into a conical receptacle 16 in the connector-plug housing. Also provided on the outer circumferential surface are positioning means 36 for the radial positioning of the connector-plug part in the connector-plug housing 14. Finally, a kink preventer 35, which prevents the cable 7 from being bent with an impermissible bending radius, is fastened to the connector-plug housing.

The invention claimed is:

1. A connector-plug part (1) for an optical plug-in connection,
   with a connector-plug pin (2) for receiving an optical waveguide extending over a longitudinal center axis (3),
   with a sleeve-like pin holder (4) with a pin receiving section (5), in which the connector-plug pin is held, and
   with a cable receiving section (6), to which the end of an optical waveguide cable (7) can be fixed in a tension-resistant manner,
   wherein the cable receiving section (6) has at least one cladding part (8), which can be pivoted at a joint (9) by a certain pivoting angle between an open position and a closed position, and
   wherein the pin holder (4) comprises at least two shell parts (10, 10'), which can be fitted together along the longitudinal center axis (3), each shell part having a pivotable cladding part.

2. The connector-plug part as claimed in claim 1, characterized in that the pin holder (4) comprises two identical shell parts (10, 10') which can be fitted together on a plane running through the longitudinal center axis (3).

3. The connector-plug part as claimed in claim 1, characterized in that neighboring shell parts have on their contacting surfaces (11) projections and clearances which engage in one another, in particular conical lugs (12) and lug openings (13).

4. A connector-plug part (1) for an optical plug-in connection,
   with a connector-plug pin (2) for receiving an optical waveguide extending over a longitudinal center axis (3),
   with a sleeve-like pin holder (4) which consists of a plastic material with a pin receiving section (5), in which the connector-plug pin is held, and
   with a cable receiving section (6), to which the end of an optical waveguide cable (7) can be fixed in a tension-resistant manner,
   wherein the cable receiving section (6) has at least one cladding part (8), which can be pivoted at a joint (9) by a certain pivoting angle between an open position and a closed position, the joint (9) connecting the pin receiving section (5) with the cable receiving section (6), and
   wherein the joint (9) is a film hinge.

5. A connector-plug part (1) for an optical plug-in connection,
   with a connector-plug pin (2) for receiving an optical waveguide extending over a longitudinal center axis (3),
   with a sleeve-like pin holder (4) with a pin receiving section (5), in which the connector-plug pin is held,
   wherein the connector-plug pin (2) is mounted with limited displaceability in the pin receiving section (5) under axial spring prestressing, and
   with a cable receiving section (6), to which the end of an optical waveguide cable (7) can be fixed in a tension-resistant manner,
   wherein the cable receiving section (6) has at least one cladding part (8), which can be pivoted at a joint (9) by a certain pivoting angle between an open position and a closed position, the joint (9) connecting the pin receiving section (5) with the cable receiving section (6).

6. The connector-plug part as claimed in claim 5, characterized in that, to secure the pin holder (4) in a connector-plug housing (14), at least one conical section (15), which can be pressed into a corresponding conical receptacle (16) on the connector-plug housing, is provided on the outside of the pin holder.

7. The connector-plug part as claimed in claim 5, the connector-plug pin (2) is fixedly held in the pin receiving section (5) and in that at least one axially resilient region is provided on the cable receiving section (6).

8. The connector-plug part as claimed in claim 5, characterized in that a rib (17) which engages in a clearance (18) in the outer circumferential surface of the connector plug pin (2) in such a way that its resilient displacement is limited and that it is held in a rotationally fixed manner is arranged on the inside of at least one shell part (10), in the region of the pin receiving section (5).

9. The connector-plug part as claimed in claim 5, characterized in that the connector-plug pin (2) is prestressed in the pin receiving section (5) by means of a helical compression spring (19).

10. The connector-plug part as claimed in claim 5, as a pre-assembled unit (10) for connecting onto the end of an optical waveguide cable (7), an optical waveguide stub (21) being fastened in the connector-plug pin (2) in such way that its stripped end (22) on the cable side lies within the pivoting region of the cladding part and the cladding part or the cladding parts being kept in an at least partly opened position.

11. A method for connecting a connector-plug part as claimed in claim 10, characterized
    in that the pin holder (4) and the cable end are clamped in such a way that the bare conductor end (22) of the optical waveguide stub (21) and the bare conductor end (23) of the optical waveguide at the cable end lie coaxially opposite each other on a centering block (28),
    in that the bare conductor ends are welded to each other,
    in that subsequently the cladding part or the cladding parts is or are pivoted into the closed position,
    and in that the cable end is connected to the cable receiving section (6) in a tension-resistant manner.

12. The method as claimed in claim 11, characterized in that, after the welding, the welded location is enclosed with a protective element (25).

13. The method as claimed in claim 11, characterized in that, after the welding, the pin holder (4) and the cable end are removed, in particular raised, from the centering block (28) in the clamped state.

14. A device for carrying out the method as claimed in claim 11, characterized by
a first clamping means (26) for clamping in the pin holder (4),
a second clamping means (27) for clamping in the cable end,
a centering block (28) with a v-shaped centering groove (29) arranged between the first and the second clamping means,
the centering block (28) having in the region of the intended welded location (24) a clearance (30) interrupting the centering groove (29).

15. The device as claimed in claim 14, characterized in that the clamping means (26, 27) are provided with a lifting device for simultaneously lifting the welded optical waveguide off the centering block (28).

16. A connector-plug part (1) for an optical plug-in connection,
with a connector-plug pin (2) for receiving an optical waveguide extending over a longitudinal center axis (3),
with a sleeve-like pin holder (4) with a pin receiving section (5), in which the connector-plug pin is held, and
with a cable receiving section (6), to which the end of an optical waveguide cable (7) can be fixed in a tension-resistant manner,
wherein the cable receiving section (6) has at least one cladding part (8), which can be pivoted at a joint (9) by a certain pivoting angle between an open position and a closed position, the joint connecting the pin receiving section (5) with the cable receiving section (6), and
wherein the joint (9) is a film hinge.

17. The connector-plug part (1) as claimed in claim 16, wherein the cladding part (8) is formed as one piece with the pin receiving section (5).

18. A connector-plug part (1) for an optical plug-in connection,
with a connector-plug pin (2) for receiving an optical waveguide extending over a longitudinal center axis (3),
with a sleeve-like pin holder (4) formed in one piece with a pin receiving section (5), in which the connector-plug pin is held, and
with a cable receiving section (6), to which the end of an optical waveguide cable (7) can be fixed in a tension-resistant manner,
wherein the cable receiving section (6) has at least one cladding part (8), which can be pivoted at a joint (9) by a certain pivoting angle between an open position and a closed position, the joint (9) connecting the pin receiving section (5) with the cable receiving section (6).

* * * * *